US008184730B2

(12) United States Patent
Talley et al.

(10) Patent No.: US 8,184,730 B2
(45) Date of Patent: May 22, 2012

(54) METHOD AND SYSTEM FOR FREQUENCY BAND ALLOCATION BASED ON FREQUENCY BAND USAGE MEASUREMENTS

(75) Inventors: Ryan S. Talley, Olathe, KS (US); Kristin Hayne, Overland Park, KS (US); Tom Trueman, Olathe, KS (US); Jerry Wade, Overland Park, KS (US); Robert Pippert, Lenexa, KS (US)

(73) Assignee: Spring Spectrum L.P., Overland Park, KS (US)

( * ) Notice: Subject to any disclaimer, the term of this patent is extended or adjusted under 35 U.S.C. 154(b) by 76 days.

(21) Appl. No.: 12/823,930

(22) Filed: Jun. 25, 2010

(65) Prior Publication Data

US 2010/0260275 A1 Oct. 14, 2010

Related U.S. Application Data

(62) Division of application No. 11/199,760, filed on Aug. 9, 2005, now Pat. No. 7,782,964.

(51) Int. Cl.
*H04K 1/10* (2006.01)

(52) U.S. Cl. ........ 375/260; 375/259; 375/267; 375/295; 375/271; 455/59; 455/62

(58) Field of Classification Search ................. 375/260, 375/259, 267, 295, 271; 455/59
See application file for complete search history.

(56) References Cited

U.S. PATENT DOCUMENTS

| 6,021,123 | A  | * | 2/2000  | Mimura ......................... 370/331 |
| 6,104,930 | A  |   | 8/2000  | Ward et al. |
| 6,356,540 | B1 | * | 3/2002  | Kojiro ........................... 370/330 |
| 6,763,015 | B1 |   | 7/2004  | Phillips et al. |
| 6,895,248 | B1 |   | 5/2005  | Akyol et al. |
| 7,035,275 | B2 |   | 4/2006  | Liang |
| 7,295,817 | B2 |   | 11/2007 | Rozhavsky et al. |
| 7,782,964 | B1 | * | 8/2010  | Talley et al. ................... 375/260 |
| 7,876,726 | B2 | * | 1/2011  | Akella et al. ................... 370/329 |
| 2002/0119781 | A1 |   | 8/2002  | Li et al. |
| 2003/0007456 | A1 | * | 1/2003  | Gupta et al. ................... 370/232 |
| 2003/0064681 | A1 |   | 4/2003  | Uedo |
| 2003/0125039 | A1 |   | 7/2003  | Lachtar et al. |
| 2004/0029579 | A1 |   | 2/2004  | Kashiwase |
| 2004/0210619 | A1 |   | 10/2004 | Balachandran et al. |

(Continued)

OTHER PUBLICATIONS

U.S. Appl. No. 11/131,713, filed May 18, 2005, entitled Dynamic Allocation of Access Channels Based on Access Channel Occupancy in a Cellular Wireless Communication System.

(Continued)

*Primary Examiner* — Kenneth Lam

(57) ABSTRACT

A method for selecting a frequency band, from among a plurality of frequency bands controllable by a radio network controller (RNC), to carry a data communication. The method may include obtaining frequency band usage measurements for a plurality of frequency bands, and using the frequency band usage measurements to select a particular frequency band of the plurality of frequency bands to carry the data communication. Frequency band usage measurements may be based on how many idle slots (and/or data channels) are carried through each of the plurality of frequency bands during a measurement time period. A comparison of the frequency band usage measurements can be used to determine which frequency band sent the greatest number of idle slots (or the fewest number of data channels). The method provides for selecting a frequency band best suited (e.g., has the most available capacity for carrying a data communication) for carrying the data communication.

14 Claims, 4 Drawing Sheets

U.S. PATENT DOCUMENTS

| | | |
|---|---|---|
| 2005/0041574 A1 | 2/2005 | Wu et al. |
| 2005/0157740 A1 | 7/2005 | Sato |
| 2006/0013216 A1 | 1/2006 | Rajkotia et al. |
| 2006/0142021 A1 | 6/2006 | Mueckenheim et al. |
| 2006/0223495 A1 | 10/2006 | Cassett et al. |
| 2006/0227750 A1 | 10/2006 | Soltanian et al. |
| 2006/0276181 A1 | 12/2006 | Malladi et al. |
| 2008/0062953 A1 | 3/2008 | Li et al. |

OTHER PUBLICATIONS

U.S. Appl. No. 11/078,845, filed Mar. 11, 2005, entitled Method and System for Dynamically Adjusting Forward-Link Transmission Power in Sole Active Sector.

U.S. Appl. No. 11/081,272, filed Mar. 16, 2005, entitled Method of Selecting Carrier Frequency for Call Origination.

* cited by examiner

METHOD AND SYSTEM FOR FREQUENCY BAND ALLOCATION BASED ON FREQUENCY BAND USAGE MEASUREMENTS

REFERENCE TO PRIOR APPLICATION

This application is a divisional application of U.S. patent application Ser. No. 11/199,760, which was filed on Aug. 9, 2005 and issued on Aug. 24, 2010 as U.S. Pat. No. 7,782,964 B1. U.S. patent application Ser. No. 11/199,760 is hereby incorporated by reference.

FIELD OF INVENTION

The present invention relates to data communication, and more particularly to management of frequency bands that carry data communications.

DESCRIPTION OF RELATED ART

1. Cellular Wireless Communications

In a typical cellular radio communications system (wireless telecommunications network), an area is divided geographically into a number of cell sites, each defined by a radio frequency (RF) radiation pattern from a respective base transceiver station (BTS) antenna. The BTSs are in turn coupled to a base station controller (BSC) or radio network controller (RNC), which is then coupled to a telecommunications switch and/or gateway, such as a packet data serving node (PDSN) to provide connectivity with a transport network such as the Internet.

When a mobile station or Access Terminal (AT) (such as a cellular telephone, pager, or appropriately equipped portable computer) is positioned in a cell, the mobile station communicates via an RF air interface with the BTS antenna of the cell. Consequently, a communication path is established between the mobile station and the telecommunications network, via the air interface, the BTS, the BSC and the switch or gateway.

With the explosive growth in demand for wireless communications, the level of call traffic in most cell sites has increased drastically over recent years. To help manage the call traffic, cells in a wireless network are often further divided geographically into a number of sectors, which may be defined by radiation patterns from directional antenna components of the respective BTS, or by respective BTS antenna. These sectors can be referred to as "physical sectors," since they are physical areas of a cell site. Therefore, at any given instance, a mobile station in a wireless network will typically be positioned in a given physical sector and will be able to communicate with the telecommunications network via the BTS serving that physical sector.

2. Legacy CDMA Communications

In a conventional or "legacy" Code Division Multiple Access ("CDMA") wireless network compliant with industry standards TIA (Telecommunications Industry Association)/EIA (Electronics Industry Association)/IS-95 and TIA/EIA/IS-2000, each cell employs one or more frequency bands, typically 1.25 MHz each, and each sector is distinguished from adjacent sectors by a pseudo-random number offset ("PN offset"). Further, each sector can concurrently communicate on multiple different channels, distinguished by "Walsh codes." When a mobile station operates in a given sector, communications between the mobile station and the BTS of the sector are carried on a given frequency band and are encoded by the sector's PN offset and a given Walsh code.

Air interface communications are divided into forward-link communications, which are those passing from the base station to the mobile station, and reverse-link communications, which are those passing from the mobile station to the base station. In an IS-95 or IS-2000 system, both the forward-link and reverse-link communications in a given sector are encoded by the sector's PN offset and a given Walsh code.

On the forward-link, certain Walsh codes are reserved for use to define control channels, including a pilot channel, a sync channel, and one or more paging channels, and the remainder can be assigned dynamically for use as traffic channels, i.e., to carry user communications. Similarly, on the reverse-link, one or more Walsh codes may be reserved for use to define access channels, and the remainder can be assigned dynamically for use as traffic channels. Further, the various forward-link channels share the forward-link power that is available in the sector. Therefore, when more mobile stations are operating in a sector, the forward-link power allocated for transmissions to each mobile station will typically be lower than when fewer mobile stations are operating in the sector.

To engage in packet-data communication in a legacy network, a mobile station first sends a packet-data connection request over the access channel to the network. The BSC then assigns a traffic channel for use by the mobile station, and the PDSN and mobile station negotiate with each other to establish a data link layer connection, such as a point to point protocol (PPP) session. Once the mobile station has a radio link (an assigned traffic channel), a data link, and an IP address, the mobile station is considered to be in an "active" mode. To conserve air interface resources, however, the wireless communication system is typically arranged to release the mobile station's assigned traffic channel after a certain amount of time during which no data traffic passes to or from the mobile station through the PDSN. Upon release of the mobile station's radio link, the mobile station is considered to be in a "dormant" mode, in which it lacks a radio link but still has a data link and an IP address.

While in the dormant mode, if the mobile station seeks to transmit packet-data from its IP address, the mobile station would re-acquire a radio link by sending a new connection request message to the BSC. Similarly, if the PDSN receives packet-data destined for the IP address of a dormant mobile station, the PDSN would notify the BSC, the BSC would page the mobile station to cause the mobile station to then re-acquire a radio link, and the PDSN would then pass the data along to the mobile station.

3. High Rate Packet-Data Communications

Under IS-2000, the highest rate of packet-data communications theoretically available on a fundamental traffic channel of the forward-link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," e.g., as defined by TIA/EIA standard IS-856. IS-856 leverages the asymmetric characteristics of most IP traffic, in which the forward-link typically carries a heavier load than the reverse-link. Under IS-856, the forward-link uses time division multiplexing (TDM), in order to allocate all power in a sector to a given user at any moment, while the reverse-link retains largely the traditional IS-2000 code division multiplexing (CDM) format, albeit with the addition of a "data rate control" (DRC) channel, which the mobile station uses to request a specific data rate and sector for communication. The end result is that a mobile station operating under IS-856 can, in theory, receive packet-data at a rate of at least 38.4 kbps and up to 2.4 Mbps.

The IS-856 forward-link in each sector is divided into time slots that are each 2,048 chips in length. Each time slot is further time division multiplexed to carry various channels, including a pilot channel, a Medium Access Control (MAC) channel, and, if any traffic exists, a forward traffic channel and a "control" channel. More particularly, each 2,048-chip time slot is divided into two half-slots of 1,024 chips each. And each half-slot is in turn divided into (i) a 400-chip data channel, (ii) a 64-chip MAC channel, (iii) a 96-chip pilot channel, (iv) another 64-chip MAC channel, and (v) another 400-chip data channel.

The IS-856 forward-link data channel includes a traffic channel and a control channel. The traffic channel transmits to a single mobile station at a time and includes a preamble sequence that indicates the start of the packet and the intended receiving mobile station. The control channel transmits both broadcast messages and mobile station-directed messages. A slot during which no traffic or control data is transmitted is referred to as an "idle slot" and would effectively not include the data channels. A slot during which traffic or control data is transmitted, on the other hand, is referred to as an "active slot" and would effectively include the data channels.

As in IS-2000, each sector in IS-856 is defined by a PN offset, and the pilot channel carries an indication of the sector's PN offset, distinguished by increments of 64 chips. An IS-856 mobile station uses the pilot for initial acquisition, phase recovery, timing recovery, and symbol combining. Further, as will be described more below, the IS-856 pilot is used to provide an estimate of channel data rate, for the purpose of rate adaptation.

Each IS-856 sector has a normal power level (e.g., 16 Watts) at which the sector transmits on the pilot channel, on the MAC channel, and, in an active slot, on the data channel. In the data channel on an idle slot, the sector will substantially reduce its output power output (e.g., to 4 Watts), but the sector will continue to transmit at its normal sector power level on the pilot and MAC channels. (In a usual case, to avoid damaging the power amplifier, the sector will not totally shut off its power amplifier during the data channel on an idle slot. Rather, the sector may simply switch to the lower power level and transmit zeros during the data channel, and then switch back to the normal power level for the MAC and pilot channels.)

When multiple sectors transmit on a common frequency, the forward-link signaling of the various sectors is synchronized by CDMA system time. Thus, all sectors will transmit their data channels (if any) at the same time, all sectors will transmit their MAC channels at the same time, and all sectors will transmit their pilot channels at the same time.

IS-856 introduces a "virtual soft handoff" concept, in which an active mobile station communicates with the network on just a "best" sector of its active set at any given time. As in IS-2000, the mobile station monitors the signal strength of pilot signals emitted by various sectors, and the mobile station uses threshold handoff parameters as a basis to trigger the addition of a sector to the mobile station's candidate set. More particularly, under IS-856, a mobile station monitors the signal strength of all pilots that it can detect and computes for each sector a signal-to-noise ratio, C/I, as the ratio of (i) C=pilot strength of the sector to (ii) I=total signal level of all detected pilots. Further, as in IS-2000, the mobile station sends a revised candidate set to the network, and the network decides whether to revise the mobile station's active set and instructs the mobile station accordingly.

Unlike IS-2000 in which forward traffic information is routed to all sectors in the mobile station's active set, however, forward traffic under IS-856 is routed on only a "best" sector that the mobile station selects from its active set, typically the sector that has the strongest pilot signal (or, more particularly, the highest signal to noise ratio (C/I)) detected by the mobile station. In practice, the mobile station will monitor the pilot signals of the sectors in its active set, and will include in its DRC (on the reverse-link) an indication (e.g., the PN) of the selected serving sector. Only that sector will then serve the mobile station with forward-link packets. Thus, a mobile station may quickly hand off from one IS-856 serving sector to another by simply instructing the base station which sector it intends to communicate with.

As noted above, the pilot signal of a selected IS-856 sector is used as a basis to estimate channel conditions and to facilitate rate adaptation. In this regard, IS-856 defines a mapping between values of C/I and forward-link data rates. Based on the C/I that the mobile station computes for its selected sector, the mobile station will use the defined mapping to select a particular data rate. And the mobile station will include in its DRC a request to receive forward-link communications at that data rate. According to IS-856, the higher the C/I, the higher the requested data rate, and the lower the C/I, the lower the requested data rate.

Upon receipt of the DRC from the mobile station, the base station will decide whether or not it will grant the mobile station's requested forward-link data rate. In this regard, the base station will apply a scheduling algorithm to determine which requests to grant and which requests to deny. The scheduling algorithm is vendor-specific and can therefore take various forms. If the base station decides to grant the request, the base station will then seek to deliver data to the mobile station at the requested rate.

To acquire packet data connectivity under IS-856, after a mobile station first detects an IS-856 frequency band, the mobile station sends to its BSC a UATI (Universal Access Terminal Identifier) request, and receives in response a UATI assignment. Upon assignment of the UATI the mobile station must then submit a connection request to acquire a MAC ID (e.g., an International Mobile Station Identifier (IMSI)), which the BSC can then use to address the mobile station in subsequent communications. In addition to the MAC ID assignment response from the connection request, the BSC responsively invokes a process to authenticate the mobile station and to have the mobile station acquire a data link.

In particular, the BSC sends an access request to an Access Network AAA (ANAAA) server, and the ANAAA server authenticates the mobile station. The BSC then assigns radio resources for the data session, by directing the mobile station to operate on a particular time slot traffic channel on the forward-link and a particular Walsh coded traffic channel on the reverse-link. Further, the BSC signals to the PDSN, and the PDSN and mobile station then negotiate to establish a PPP data link. In addition, as in the IS-2000 process, the mobile station then sends an Mobile Internet Protocol (MIP) Registration Request (RRQ) to the PDSN, which the PDSN forwards to a Home Agent (HA), and the HA assigns a MIP address for the mobile station to use.

As in IS-2000, once the mobile station has acquired an IS-856 radio link, a data link, and an IP address, the mobile station is considered to be in an active mode, also known as the connected state. In the active mode, the mobile station can receive the sector's forward-link in a time slot assigned to that particular mobile station. Further, an active mode mobile station transmits reverse-link signaling at substantially all times to one or more active set sectors. (As a more general matter, a mobile station can be considered to be in an "active" mode when radio link resources, such as a reverse-link channel, and perhaps also a forward-link timeslot, are reserved for its use to engage in packet-data communication.)

Still further, as in IS-2000, if the mobile station does not send or receive data for a defined period of time, the mobile station enters a dormant mode. In the dormant mode, an IS-856 system maintains the logical state of the mobile station's session (e.g., IP address, PPP state, and radio link session information), while releasing the mobile station's radio link resources (e.g., the time slot that had been assigned for communications to the mobile station and the reverse-link channel that had been assigned for communications from the mobile station). With the maintained session state, the mobile station can quickly re-acquire a radio link so as to send or receive packet data, thereby giving the appearance that the mobile station is "always on."

SUMMARY

The present invention is directed to selecting a frequency band for carrying a data communication. In one respect, an exemplary embodiment of the invention may take the form of a method comprising: (i) obtaining frequency band usage measurements for a plurality of frequency bands, and (ii) using the frequency band usage measurements to select a particular frequency band from among the plurality of frequency bands to carry a data communication.

In another respect, an exemplary embodiment of the invention may take the form of a method comprising: (i) obtaining frequency band usage measurements for a plurality of frequency bands controlled by a radio network controller (RNC), (ii) using the frequency band usage measurements to select a particular frequency band from among the plurality of frequency bands to carry a data communication associated with a new data communication request, and (iii) receiving the new data communication request and responsively using the particular frequency band to carry the data communication associated with the new data communication request.

In yet another respect, an exemplary embodiment of the invention may take the form of a method of selecting a frequency band, from among a plurality of frequency bands controlled by a radio network controller (RNC), to carry a data communication associated with a new data communication request. In this regard, the method comprises: (i) determining how many idle slots are carried in each of the plurality of frequency bands during a measurement time period, (ii) determining which of the plurality of frequency bands carried a greatest number of idle slots during the measurement time period to select a particular frequency band, and (iii) receiving a new data communication request and responsively allocating the particular frequency band to carry a data communication associated with the new data communication request.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention, in its exemplary embodiments, provides a method of selecting a frequency band to carry a data communication. The frequency band is selected from a plurality of frequency bands capable of carrying data communications. The data communications carried within the plurality of frequency bands may comprise voice traffic, packet data traffic, and/or other data.

In an exemplary embodiment, frequency band usage measurements are obtained for a plurality of frequency bands, and the frequency band usage measurements are used to select a particular frequency band to carry a data communication. The frequency band usage measurements provide an indication as to which of the plurality of frequency bands may be best suited for carrying the data communication.

Various methods may be used to obtain frequency band usage measurements. For example, frequency band usage measurements may be obtained by determining how many idle slots (or data channels) are carried in each of a plurality of frequency bands during a measurement time period. In the case of determining how many idle slots are carried in the plurality of frequency bands during the measurement time period, the particular frequency band which carried the greatest number of idle slots during the measurement time period may be best-suited for carrying the data communication (e.g., because the particular frequency band has the most capacity for carrying the data communication).

Alternatively, in the case of determining how many data channels are carried in the plurality of frequency bands during the measurement time period, the particular frequency band which carried the fewest number of data channels during the measurement time period may be best-suited for carrying the data communication. Other methods for obtaining frequency band usage measurements are also possible, as described below.

In an exemplary embodiment, the frequency band usage measurements may be obtained periodically (or occasionally) and prior to carrying the data communication through a frequency band. A determination of a particular frequency band best-suited for carrying the data communication (based on the frequency band usage measurements) may be made prior to the when the data communication is to be carried through a frequency band. In this way, the data communication can be carried through the particular frequency band when the data communication is to be carried through a frequency band without delay attributable to determining which frequency band is best-suited for carrying the data communication.

2. Example Architecture

Figure 1:
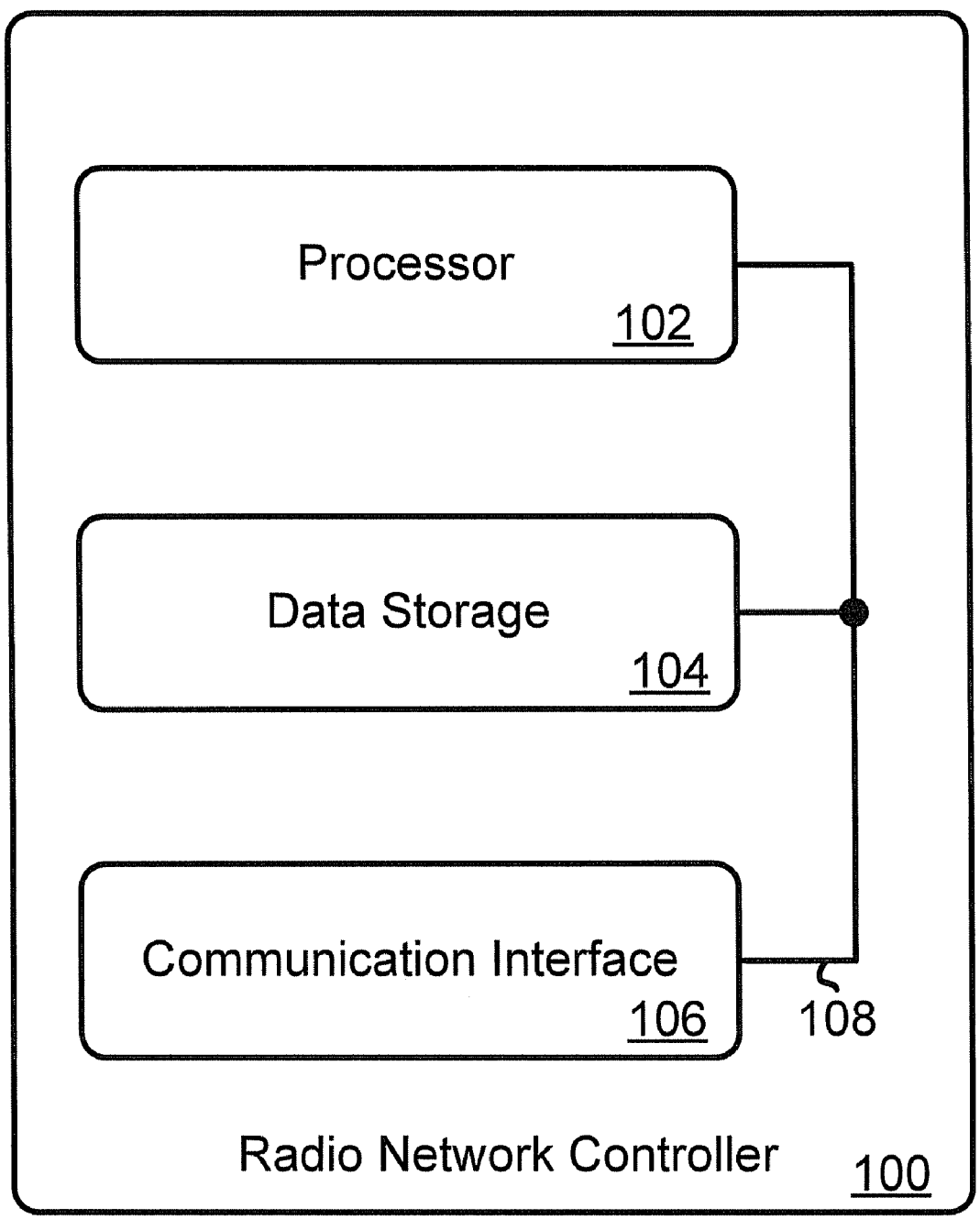
FIG. 1 is a block diagram of a radio network controller (RNC), in accordance with an exemplary embodiment.

An exemplary embodiment may be carried out in a Radio Network Controller (RNC) 100 as shown in FIG. 1. As shown in FIG. 1, the RNC 100 may include a processor 102, data storage 104, and a communication interface 106, all linked together via a system bus, network, or other connection mechanism 108.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

The processor 102 may comprise one or more processors (e.g., a general purpose processor and/or a digital signal processor). The processor 102 provides means for executing program instructions. Execution of program instructions allows the processor 102 to work in cooperation with the data storage 104 and/or the communication interface 106, so as to carry out functions described herein.

The data storage 104 comprises a computer readable medium readable by the processor 102. The computer readable medium may comprise volatile and/or non-volatile storage components, such as optical, magnetic, organic or other memory or disc storage, which can be integrated in whole or in part with the processor 102.

The data storage 104 may store various types of data. The data storage 104 may store data arranged as program instructions executable by the processor 102. As an example, the program instructions may comprise instructions for measuring a measurement time period and/or instructions to provide an indication to the processor 102 when the measurement time period begins and/or when the measurement time period ends. In this regard, the processor 102 executes program instructions so as to carry out functionality of a timer.

As another example, the program instructions may comprise instructions to count the number of occurrences of a given event (e.g., transmission of an idle slot in a given frequency band) during the measurement time period. In this regard, the processor 102 executes program instructions so as to carry out functionality of a counter (or a plurality of counters, one for each of the plurality of frequency bands). Other examples of program instructions, such as program instructions arranged to carry out the functions described herein, and other examples of the various types of data that can be stored in the data storage 104 are also possible.

Figure 2:
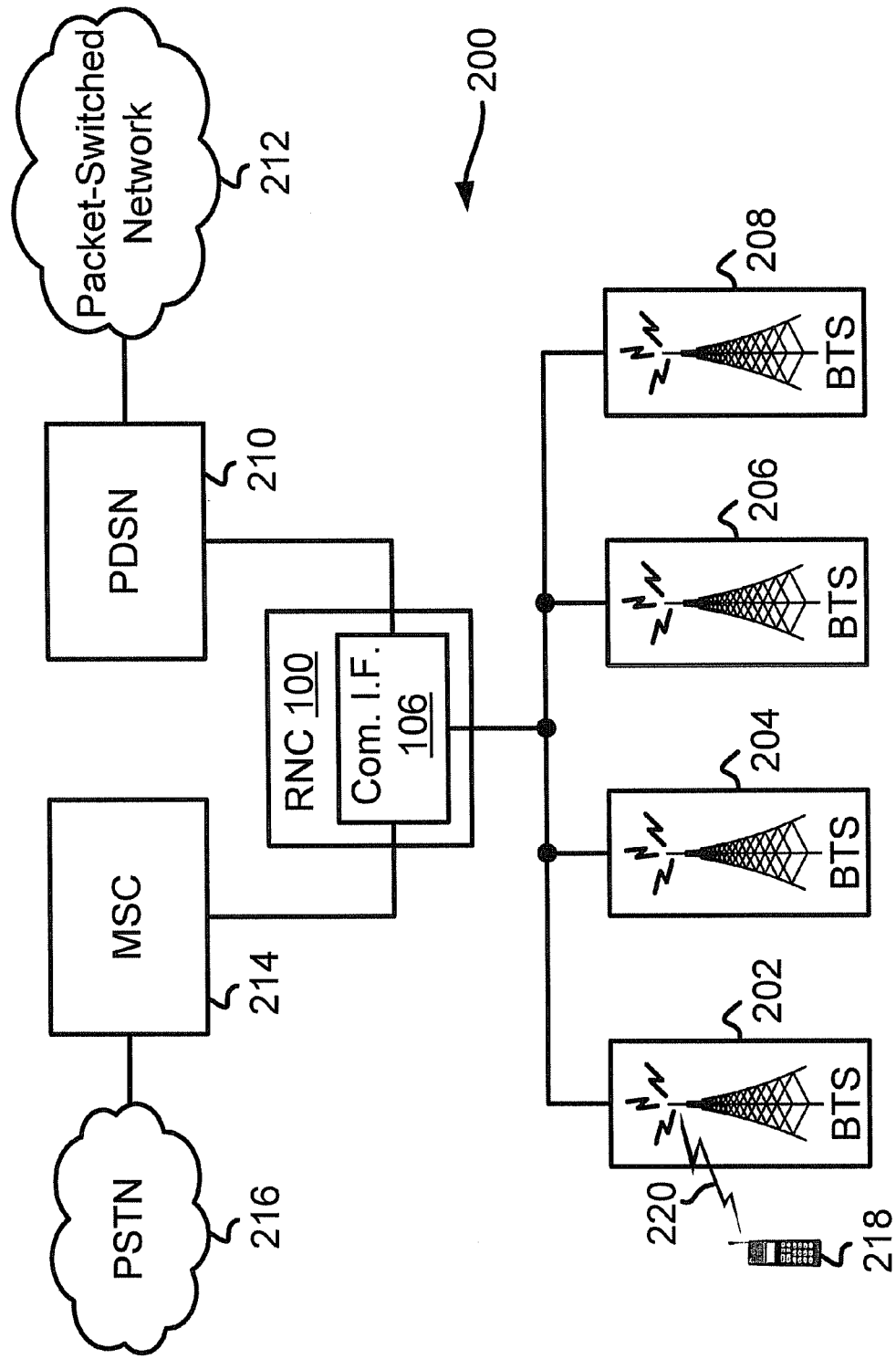
FIG. 2 is a block diagram depicting a network architecture, in accordance with an exemplary embodiment.

The communication interface 106 may comprise one or more communication interfaces so as to allow the RNC 100 to provide an interface to a variety of entities. Examples of the various entities that interface to the communication interface 106 are shown in FIG. 2. As shown in FIG. 2, an example network architecture 200 illustrates that the communication interface 106 provides an interface to (i) a plurality of BTSs 202, 204, 206, 208, (ii) a gateway, such as a PDSN 210, for providing connectivity to a packet-switched network 212, and (iii) a telecommunications switch, such as an MSC 214, for providing connectivity to a public switched telephone network (PSTN) 216.

A mobile station 218 can communicate with a BTS, such as BTS 202, via an air interface 220. The mobile station 218 may comprise a wireless telephone, a wireless personal digital assistant (PDA), a wirelessly equipped laptop computer, or other wireless communication device. One or more other mobile stations (not shown) can communicate with one or more of BTSs 202, 204, 206, 208.

The mobile station 218, as well as the air interface 220, the BTSs 202, 204, 206, 208, and the RNC 100, may be arranged to function according to one or more standards such as (i) an IS-856 Evolution for Data Only (EV-DO) standard for performing high rate packet data (HRPD) communication services, and (ii) an IS-2000 standard for performing voice and short messaging communication services on IS-2000 networks. Other examples of the one or more standards are also possible.

The BTS 202 may provide (i) a single wireless coverage area, e.g., a cell, or (ii) a plurality of wireless coverage areas, e.g., by using directional antennas, to provide multiple sectors within a given cell. Each sector may comprise one or more "sector-carriers" that each include a forward-link frequency band and a reverse-link frequency band. A forward-link frequency band carries data communications from the BTS 202 to the mobile station 218. A reverse-link frequency band carries data communications from the mobile station 218 to the BTS 202.

A frequency band, whether a forward-link frequency band or a reverse-link frequency band, is a given amount of RF spectrum allocated for performing data communications. The given amount of RF spectrum in a given forward-link frequency band or a given reverse-link frequency band is typically defined by an air interface standard, such as the 1.25 MHz. frequency bands defined by the IS-2000 standard. Other examples of the amount of RF spectrum in a frequency band or other examples of a standard to define the amount of RF spectrum in a frequency band, are also possible.

A forward-link frequency band may be arranged to include a pilot channel, a paging channel, and a plurality of forward traffic channels. A reverse-link frequency band may be arranged to include an access channel and a plurality of reverse traffic channels. Other examples of arranging a forward-link frequency band or a reverse-link frequency band are also possible.

Figure 3:
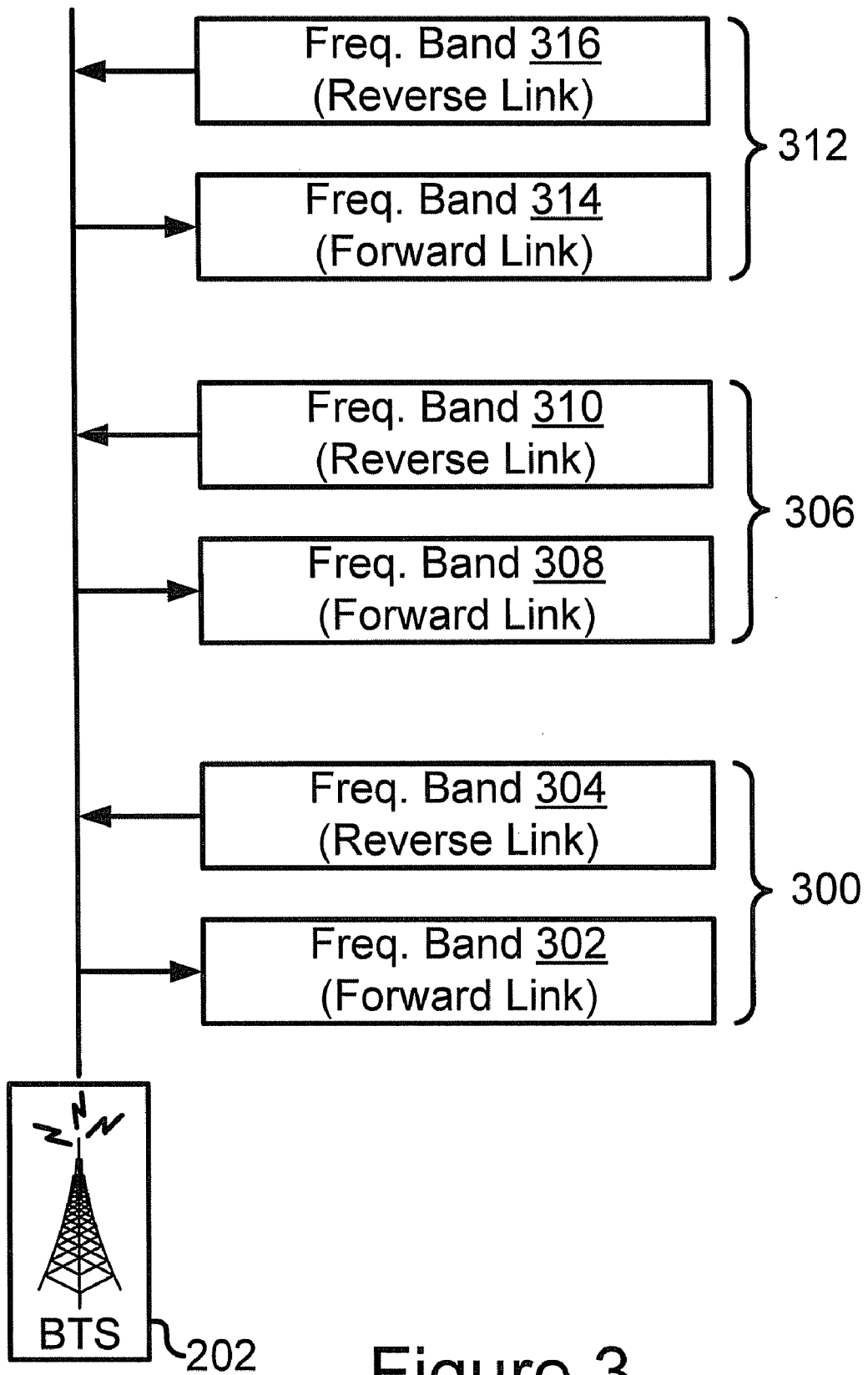
FIG. 3 is a block diagram depicting a base transceiver station (BTS) and frequency band allocation for the BTS, in accordance with an exemplary embodiment.

FIG. 3 illustrates, by way of example, that the BTS 202 functions with (i) a first sector-carrier 300 comprising a first frequency band 302 for performing forward link communications and a second frequency band 304 for performing reverse link communications, (ii) a second sector-carrier 306 comprising a third frequency band 308 for performing forward link communications and a fourth frequency band 310 for performing reverse link communications, and (iii) a third sector-carrier 312 comprising a fifth frequency band 314 for performing forward link communications and a sixth frequency band 316 for performing reverse link communications.

Alternatively, the BTS 202 may function with a number of sector-carriers greater than or less than three sector-carriers. Moreover, the BTS 204, 206, 208, may each function with one or more sector-carriers, some of which comprise frequency bands that function in the same frequencies as the frequency bands of the first sector-carrier 300, the second sector-carrier 306, and the third sector-carrier 312.

3. Example Operation

Figure 4:
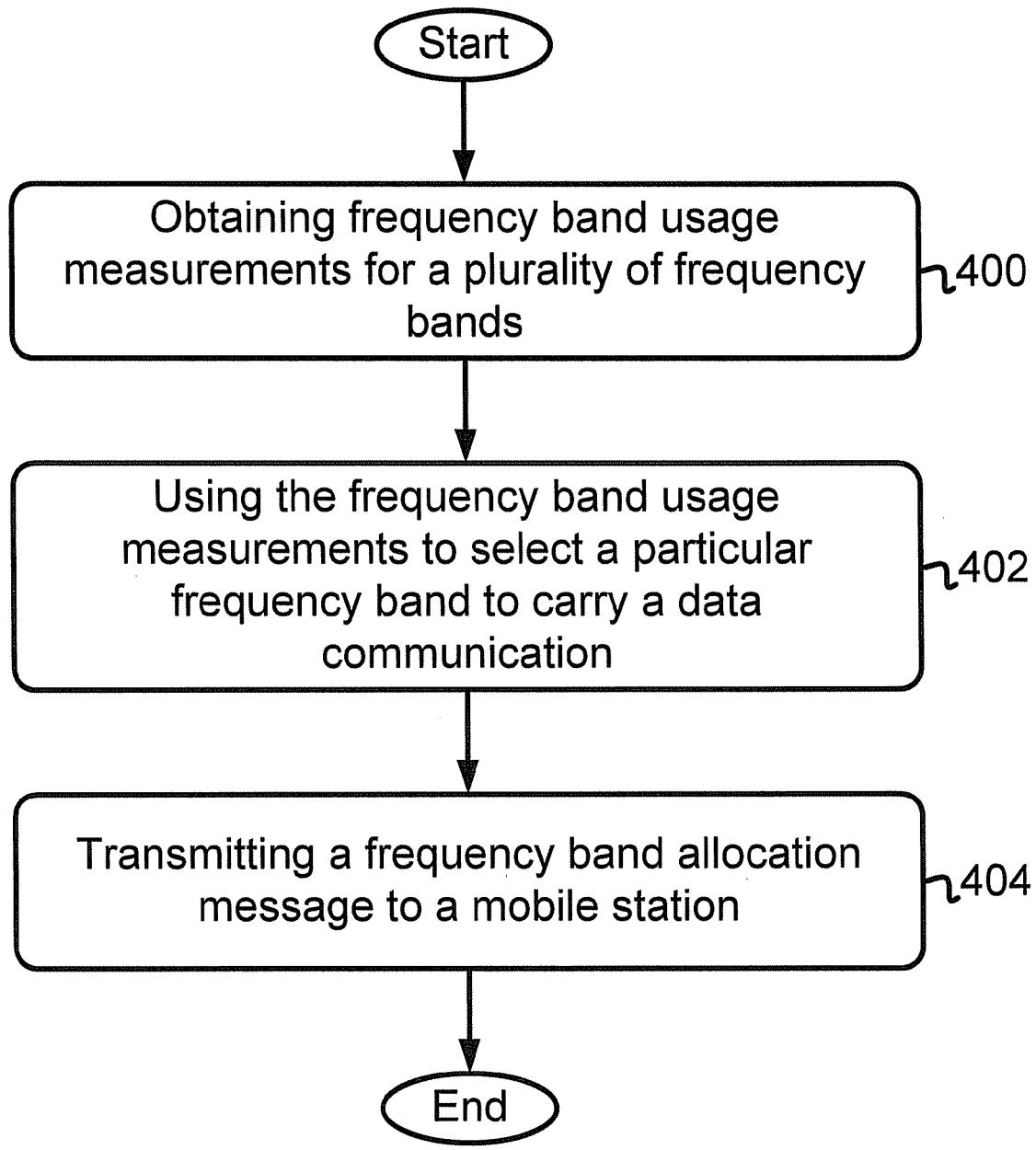
FIG. 4 is a flow chart depicting a set of functions that can be carried out in accordance with an exemplary embodiment.

FIG. 4 is a flow chart provided to illustrate some of the functions that may be carried out in accordance with an exemplary embodiment. As shown in FIG. 4, block 400 involves obtaining frequency band usage measurements for a plurality of frequency bands. The plurality of frequency bands may be controlled by an RNC (e.g., RNC 100) in combination with one or more BTSs (e.g., one or more of BTSs 202, 204, 206, 208) coupled to the RNC. Alternatively, however, another mechanism, such as a BSC, could provide control of the plurality of frequency bands. Further, as yet another alternative, the plurality of frequency bands may be controlled by a plurality of RNCs in combination with one or more BTSs coupled to the plurality of RNCs. Other examples of a mechanism(s) that control the plurality of frequency bands are also possible.

Various methods may be used to obtain frequency band usage measurements for the plurality of frequency bands. For example, obtaining frequency band usage measurements for the plurality of frequency bands may comprise determining how many idle slots are carried in each of the plurality of frequency bands during a measurement time period. In this regard, the RNC 100 may execute program instructions arranged as timer to measure the measurement time period and other program instructions to count how many idle slots are carried in each of the plurality of frequency bands during the measurement time period. In particular, the program instruction to count how many idle slots are carried in each of the plurality of frequency bands may comprise instructions to count how many idle slots are carried through at least one forward traffic channel of each of the plurality of frequency bands during the measurement time period.

As another example, obtaining frequency band usage measurements for a plurality of frequency bands may comprise determining how many data channels are carried in each of the plurality of frequency bands during a measurement time period. In this regard, the RNC 100 may execute program instructions arranged as timer to measure the measurement time period and other program instructions to count how many data channels are carried in each of the plurality of frequency bands during the measurement time period.

In particular, the program instruction to count how many data channels are carried in each of the plurality of frequency bands may comprise instructions to count how many data channels are carried through at least one forward traffic channel of each of the plurality of frequency bands during the measurement time period. As an example, in an RNC arranged according to an IS-856 standard, the program instructions may be arranged to count how many 400-chip data channels are sent in each half-slot for each time slot carried in the forward-link frequency bands.

As yet another example, obtaining frequency band usage measurements for a plurality of frequency bands may comprise determining how many data channels and how many idle slots are carried in each of the plurality of frequency bands during a measurement time period. Other examples of obtaining frequency band usage measurements for a plurality of frequency bands are also possible.

A variety of measurement time periods could be used as the measurement time period in which the frequency band usage measurements are obtained. For example, the measurement time period could comprise a time period of one second. Alternatively, the measurement time period could comprise a time period that is greater than or less than one second.

Next, block 402 involves using the frequency band usage measurements to select a particular frequency band to carry a data communication. Various methods of using the frequency band usage measurements are available to select a particular frequency band to carry a data communication. The methods for using the frequency band usage measurements to select the particular frequency may depend, in part, on the method used to obtain the frequency band usage measurements.

For example, if the frequency band usage measurements are based on how many idle slots are carried through each of the frequency bands during a measurement time period, then using the frequency band usage measurements may comprise comparing the frequency band usage measurements to determine which of the plurality of frequency bands carried the greatest number of idle slots during the measurement time period.

A particular frequency band that carried the greatest number of idle slots during the measurement time period may be selected because the particular frequency band may be a frequency band that can best carry additional data communications. In this regard, for instance, the particular frequency band may be able to best carry the additional data communications because the additional data communications will not cause the particular frequency band to reach its capacity for carrying data communications.

As another example, if the frequency band usage measurements are based on how many data channels are carried through each of the frequency bands during a measurement time period, then using the frequency band usage measurements may comprise comparing the frequency band usage measurements to determine which of the plurality of frequency bands carried the fewest number of data channels during the measurement time period.

A particular frequency band that carried the fewest number of data channels during the measurement time period may be selected because the particular frequency band may be a frequency band that can best carry additional data communications. Again, the particular frequency band may be able to best carry the additional data communications because the additional data communications will not cause the particular frequency band to reach its capacity for carrying data communications.

The data communication to be carried via the selected frequency band based on the frequency band usage measurements may comprise a data communication that is associated with a new data communication request. As an example, if a new data communication request comprises a request for communicating packet data traffic, then the data associated with the new data communication request comprises packet data traffic.

The new data communication request may be arranged in various ways. For example, the new data communication request may be arranged as a connection request sent from a mobile station. Further, by way of example, the connection request may be sent (i) when the mobile station does not have a radio link and data link, or (ii) when the mobile station is considered to be in a "dormant" mode (i.e., when the mobile station lacks a radio link but still has a data link and an IP address).

As another example, the new data communication request may be arranged as a message comprising a request for connection to the mobile station. In one respect, the request for connection to the mobile station may be sent to the RNC 100 from a packet-network device that is located remote from the RNC 100. The packet-network device may comprise a network server that (i) is coupled to the packet-switched network 212, and (ii) provides access to web (i.e., World Wide Web) pages.

In another respect, the request for connection to the mobile station may comprise a message generated within the RNC 100. The message generated within the RNC 100 may be generated in response to the processor 102 executing program instructions that determine a connection with the mobile station is required. As an example, a connection with the mobile station may be required when the frequency band currently selected for the mobile station is needed to carry data communications for another mobile station currently using the selected frequency band. In this regard, the other mobile station may require more data communication capacity of the selected frequency band.

As another example, a connection with the mobile station may be required when the RNC 100 detects that a data storage buffer within the RNC 100 contains data that is to be sent to the mobile station. In response to detecting the data stored in the data storage buffer, the RNC 100 may generate a message to request connection to the mobile station. The message to request connection to the mobile station can trigger the mobile station to switch from the dormant state to an active state so that the data stored within the data storage buffer can be sent to the mobile station.

The RNC 100 may respond to a new data communication request in a variety of ways. For example, in response to receiving a new data communication request, the RNC 100 may allocate the selected frequency band to carry the data communication associated with the new data communication request. Allocation of the selected frequency band comprises reserving the selected frequency band for carrying the data communication prior to carrying the data associated with the new data communication request via the selected frequency band. According to an exemplary embodiment, the RNC 100 selects the frequency band prior to receiving the new data communication request.

As another example, in response to receiving a new data communication request, the RNC 100 may begin using the selected frequency band to carry the data communication associated with the new data communication request. In this regard, the RNC 100 may use the selected frequency band to carry the data communication without allocating the selected frequency band prior to using the selected frequency band. In order for the mobile station 218 to use the selected frequency band carrying the data communication associated with the new data communication request, the mobile station 218 may need to receive a frequency band allocation message, as described below.

Next, block 404 involves transmitting a frequency band allocation message to a mobile station. The frequency band allocation message may be generated in the RNC 100 and then transmitted to the BTS 202, for transmission, in turn, to the mobile station 218. The BTS 202 may transmit the frequency band allocation message via a paging channel of a first frequency band. The mobile station 218 may be currently tuned to receive data communications via the first frequency band.

A frequency band allocation message provides an indication of the frequency band the mobile station should use to perform data communications. In the case where the mobile station is currently tuned to perform data communications via the first frequency band, the frequency band allocation message may provide an indication that the mobile station should use a second frequency band. In this regard, the frequency band allocation message instructs (or requests) the mobile station 218 to switch frequency bands (from the first frequency band to the second frequency band) to perform data communications. Alternatively, the frequency band allocation message could provide an indication that the mobile station 218 should continue using the first frequency band, such that the mobile station 218 does not have to switch frequency bands to perform data communications.

The frequency band allocation message may be arranged in various configurations so as to provide the indication of the frequency band the mobile station should use to perform data communications. For example, the frequency band allocation message may be arranged such that the message indicates the mobile station 218 should tune to a frequency of the selected frequency band. As another example, the frequency band allocation message may be arranged such that the message indicates the mobile station should tune to the frequency band having a given lower frequency (e.g., 1805 MHz) and a given upper frequency (e.g., 1806.25 MHz). As another example, the frequency band allocation message may be arranged such that the message indicates a given channel number (or channel numbers) that are assigned to a given channel (or channels) of the selected frequency band. Other examples of the various configurations for the frequency band allocation message are also possible.

In response to receiving the frequency band allocation message, the mobile station 218 could respond in various ways. For example, the mobile station 218 could tune to the frequency band identified in the frequency band allocation message. As another example, the mobile station 218 may send a frequency band allocation response message to the RNC 100 to acknowledge receipt of the frequency band allocation message and/or to indicate to the RNC 100 that the mobile station 218 will tune to the selected frequency band. Other examples of ways in which the mobile station 218 responds to receiving a frequency band allocation message are also possible.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method for selecting a frequency band to carry a data communication associated with a new data-communication request, the frequency band being one of a plurality of forward-link frequency bands controlled by a controller, the method comprising:
   the controller executing computer-readable program instructions arranged as a timer to measure a measurement time period;
   the controller counting how many data channels are carried in each forward-link frequency band of the plurality of forward-link frequency bands during the measurement time period;
   the controller determining from among the plurality of forward-link frequency bands a particular forward-link frequency band that carried a fewest number of data channels during the measurement time period; and
   the controller receiving a new data-communication request and responsively allocating the particular frequency band that carried the fewest number of data channels during the measurement time period to carry a data communication associated with the new data-communication request.

2. The method of claim 1,
   wherein determining the particular forward-link frequency band that carried the fewest number of data channels during the measurement time period comprises the controller comparing how many data channels were carried in the particular forward-link frequency band to how many data channels were carried in each of the other forward-link frequency bands of the plurality of frequency bands.

3. The method of claim 1, further comprising:
   after allocating the particular frequency band, carrying the data communication associated with the new data-communication request via the particular frequency band.

4. The method of claim 1, further comprising:
the controller transmitting a frequency band allocation message to a mobile station, wherein the frequency band allocation message identifies that the mobile station is to use the particular frequency band for performing data communications.

5. A method for selecting a frequency band to carry a data communication associated with a new data-communication request, the frequency band being one of a plurality of forward-link frequency bands controlled by a radio network controller (RNC), the method comprising:
the RNC executing computer-readable program instructions arranged as a timer to measure a measurement time period;
the RNC executing computer-readable program instructions for counting how many data channels are carried in each forward-link frequency band of the plurality of forward-link frequency bands during the measurement time period;
the RNC determining from among the plurality of forward-link frequency bands a particular forward-link frequency band that carried a fewest number of data channels during the measurement time period, wherein determining the particular forward-link frequency band that carried the fewest number of data channels during the measurement time period comprises the RNC comparing how many data channels were carried in the particular forward-link frequency band to how many data channels were carried in each of the other forward-link frequency bands of the plurality of frequency bands; and
the RNC receiving a new data-communication request and responsively allocating the particular frequency band that carried the fewest number of data channels during the measurement time period to carry a data communication associated with the new data-communication request.

6. The method of claim 5, wherein receiving the new data-communication request comprises receiving a data communication request message from a mobile station.

7. The method of claim 5,
wherein receiving the new data-communication request comprises receiving a message requesting connection to a mobile station, and
wherein the message requesting connection to the mobile station is sent from a packet-network device located remote from the RNC.

8. The method of claim 5,
wherein receiving the new data-communication request comprises receiving a message requesting connection to a mobile station, and
wherein the message requesting connection to the mobile station is generated within the RNC.

9. The method of claim 5, further comprising:
the RNC transmitting a frequency band allocation message to a mobile station, wherein the frequency band allocation message comprises a request for the mobile station to carry data communications associated with the new data-communication request via the particular frequency band.

10. The method of claim 5, wherein the new data-communication request comprises a connection request sent from a mobile station.

11. The method of claim 5,
wherein the plurality of forward-link frequency bands comprises a first forward-link frequency band, and
wherein counting how many data channels are carried in the first forward-link frequency band comprises counting how many data channels are carried in at least one forward traffic channel of the first forward-link frequency band.

12. The method of claim 5,
wherein the plurality of forward-link frequency bands comprises a first forward-link frequency band divided into a plurality of time slots, and
wherein counting how many data channels are carried in the first forward-link frequency band comprises counting how many data channels are sent during the time slots sent during the measurement time period.

13. The method of claim 5,
wherein each time slot of the plurality of time slots is 2,048 chips in length, and
wherein each data channel of the plurality of time slots is 400 chips in length.

14. The method of claim 5, further comprising:
after allocating the particular frequency band, carrying the data communication associated with the new data-communication request via the particular frequency band.

* * * * *

UNITED STATES PATENT AND TRADEMARK OFFICE
CERTIFICATE OF CORRECTION

PATENT NO. : 8,184,730 B2
APPLICATION NO. : 12/823930
DATED : May 22, 2012
INVENTOR(S) : Ryan S. Talley et al.

Page 1 of 1

It is certified that error appears in the above-identified patent and that said Letters Patent is hereby corrected as shown below:

On the title page, item [73], please delete Assignee "Spring Spectrum L.P." and add Assignee -- Sprint Spectrum L.P. --.

Signed and Sealed this
Twenty-first Day of May, 2013

Teresa Stanek Rea
*Acting Director of the United States Patent and Trademark Office*